(12) United States Patent
Brookman et al.

(10) Patent No.: US 9,499,056 B2
(45) Date of Patent: Nov. 22, 2016

(54) AIR START STEAM ENGINE

(71) Applicant: Averill Partners, LLC, Branford, CT (US)

(72) Inventors: Michael Jeffrey Brookman, Branford, CT (US); Nathan C. Jones, New Haven, CT (US)

(73) Assignee: Averill Partners, LLC, Branford, CT (US)

( * ) Notice: Subject to any disclaimer, the term of this patent is extended or adjusted under 35 U.S.C. 154(b) by 0 days.

(21) Appl. No.: 14/999,108

(22) Filed: Mar. 31, 2016

(65) Prior Publication Data

US 2016/0297304 A1    Oct. 13, 2016

Related U.S. Application Data

(63) Continuation-in-part of application No. 13/986,374, filed on Apr. 25, 2013, now Pat. No. 9,309,785, which is a continuation-in-part of application No. 12/801,841, filed on Jun. 28, 2010, now Pat. No. 8,459,391, which is a continuation-in-part of application No. 11/770,022, filed on Jun. 28, 2007, now Pat. No. 7,743,872.

(51) Int. Cl.
*B60K 3/00* (2006.01)
*B60K 3/02* (2006.01)
(Continued)

(52) U.S. Cl.
CPC ................. *B60L 11/12* (2013.01); *B60K 3/00* (2013.01); *B60K 3/02* (2013.01); *B60K 3/04* (2013.01); *B60L 11/04* (2013.01); *B60L 11/1805* (2013.01); *F01D 15/10* (2013.01); *F01K 7/165* (2013.01); *F01K 7/36* (2013.01); *F01K 15/02* (2013.01); *F01K 21/045* (2013.01); *F01K 25/06* (2013.01); *F01K 25/08* (2013.01); *F02C 1/02* (2013.01); *H02K 7/1823* (2013.01)

(58) Field of Classification Search
CPC ............ B60K 3/00; B60K 3/02; B60K 3/04; F01K 21/04
See application file for complete search history.

(56) References Cited

U.S. PATENT DOCUMENTS 1,060,034 A    4/1913  Stanley
1,330,863 A    2/1920  Griffin
(Continued)

FOREIGN PATENT DOCUMENTS

DE          4219514       12/1993
WO    WO 2006/242209     3/2006

*Primary Examiner* — Bryan Evans
(74) *Attorney, Agent, or Firm* — Michael de Angeli

(57) ABSTRACT

A method and system using at least two different working fluids to be supplied to an expander to cause it to do mechanical work. The expander is started by providing a compressed gaseous working fluid at a sufficient pressure to the expander. At the same time the compressed gaseous working fluid is provided to the expander, a second working fluid that is liquid at ambient temperatures is provided to a heater to be heated. The second working fluid is heated to its boiling point and converted to pressurized gas Once the pressure is increased to a sufficient level, the second working fluid is injected into the expander to generate power, and the supply of the first working fluid may be stopped. After expansion in the expander, the working fluids are is exhausted from the expander, and the second working fluid may be condensed for separation from the first working fluid. Control circuitry controls the admission of the first and second working fluids responsive to monitoring the load on the expander.

29 Claims, 11 Drawing Sheets

(51) Int. Cl.

| | | |
|---|---|---|
| *B60K 3/04* | (2006.01) | |
| *F01K 21/04* | (2006.01) | |
| *B60L 11/12* | (2006.01) | |
| *F01K 15/02* | (2006.01) | |
| *F01K 25/06* | (2006.01) | |
| *F01K 25/08* | (2006.01) | |
| *F01K 7/16* | (2006.01) | |
| *F01K 7/36* | (2006.01) | |
| *F01D 15/10* | (2006.01) | |
| *F02C 1/02* | (2006.01) | |
| *B60L 11/04* | (2006.01) | |
| *B60L 11/18* | (2006.01) | |
| *H02K 7/18* | (2006.01) | |

(56) References Cited

U.S. PATENT DOCUMENTS

| | | |
|---|---|---|
| 1,385,845 A | 7/1921 | Scott |
| 1,671,121 A | 2/1928 | Nordberg |
| 1,675,600 A | 7/1928 | Doble |
| 3,518,975 A | 7/1970 | Schmidt |
| 3,672,048 A | 6/1972 | Conwell |
| 3,728,858 A | 4/1973 | Sorensen |
| 4,437,308 A | 3/1984 | Fischer |
| 4,489,563 A | 12/1984 | Kalina |
| 4,590,766 A | 5/1986 | Striebich |
| 4,708,849 A | 11/1987 | Meilnik, Jr. et al. |
| 5,255,519 A | 10/1993 | Kakovitch |
| 5,444,981 A | 8/1995 | Kakovitch |
| 5,606,859 A | 3/1997 | Ploshkin |
| 6,209,672 B1 | 4/2001 | Sevrinsky |
| 6,250,078 B1 | 6/2001 | Amendola et al. |
| 6,523,347 B1 | 2/2003 | Jimov |
| 6,628,006 B2 * | 9/2003 | Oglesby ............ B60L 11/1881 290/1 R |
| 6,834,503 B2 | 12/2004 | Freymann |
| 7,080,512 B2 | 7/2006 | Schoell |
| 7,104,348 B2 | 9/2006 | Fasanello, Jr. |
| 7,178,324 B2 | 2/2007 | Sakita |
| 7,203,593 B2 | 4/2007 | Lepley et al. |
| 7,314,104 B2 | 1/2008 | Ketcham |
| 7,743,872 B2 * | 6/2010 | Brookman ............ F01K 15/02 180/302 |
| 8,459,391 B2 * | 6/2013 | Brookman ............ F01K 15/02 180/165 |
| 2006/0064986 A1 | 3/2006 | Ginter et al. |
| 2006/0137922 A1 | 6/2006 | Ketcham |
| 2007/0163819 A1 | 7/2007 | Richter et al. |
| 2008/0087002 A1 | 4/2008 | Zhou |
| 2008/0229747 A1 | 9/2008 | Yatsuzaka et al. |
| 2008/0271454 A1 | 11/2008 | Hansen |
| 2008/0282701 A1 | 11/2008 | Komali et al. |

* cited by examiner

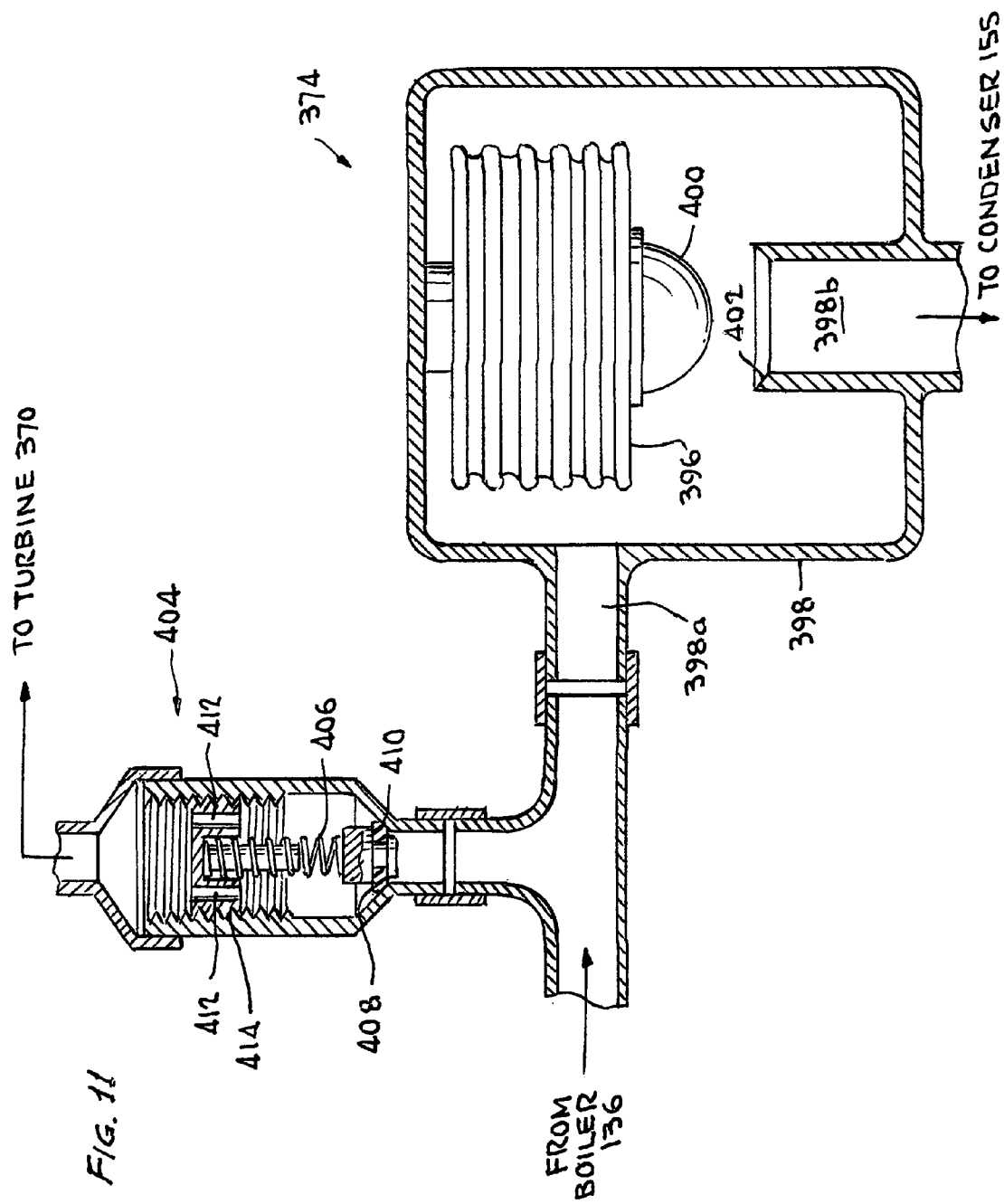

AIR START STEAM ENGINE

CROSS-REFERENCE TO RELATED APPLICATION

This application is a continuation-in-part of Ser. No. 13/986,374, filed Apr. 25, 2013, to issue as U.S. Pat. No. 9,309,785 on Apr. 12, 2016, which was a continuation-in-part of Ser. No. 12/801,841, filed Jun. 28, 2013, which issued as U.S. Pat. No. 8,459,391 on Jun. 11, 2013, and which was a continuation-in-part of Ser. No. 11/770,022 filed Jun. 28, 2007, which issued Jun. 29, 2010 as U.S. Pat. No. 7,743,872.

TECHNICAL FIELD

The present invention is related to external combustion engines. More specifically, the present invention is related to an external combustion engine that is operable responsive to supply of two pressurized gaseous working fluids.

BACKGROUND OF THE INVENTION

Steam engines and other external combustion engines have been known for many years. They have been used on a variety of vehicles and equipment to perform work. For example, they have been used in steamboats, steam locomotives, to power electrical generators and even in some of the very first automobiles. External combustion engines use a fuel source, such as wood or coal, to generate heat. Instead of burning the fuel to directly generate power, this heat is used to heat a working fluid such as water in a boiler to its boiling point. Once the water becomes vapor, that is, steam, additional heat allows the pressure in the boiler to increase. The energy in this pressurized steam is employed to cause the engine to produce power.

For example, in a reciprocating-piston engine, the pressurized steam is supplied from the boiler to the cylinders to cause the pistons to move. The movement of the pistons transfers the energy in the steam to the engine, transforming it into power delivered to a rotating vehicle drive shaft or other device to do work. The steam in the cylinder cools as it expands in the cylinder as the piston moves, increasing the volume of the cylinder. In a double- or triple-expansion engine, the steam is supplied from the exhaust of the first cylinder to a second cylinder, usually of larger capacity, so as to extract further work from further expansion, and so on. The cooled steam is either exhausted by the engine into the atmosphere or condensed for later reheating and resupply to the steam engine.

There are two problems commonly associated with steam engines that make their use in vehicles undesirable, especially in on-demand vehicles such as personal automobiles. First, typical boilers require a significant amount of time to warm up and produce useful quantities of steam. It can take upwards of 5-10 minutes to generate enough steam to move the vehicle at highway speeds. While this amount of time to warm up the boiler is sometimes acceptable in larger, scheduled vehicles, such as trains and boats, it is generally not acceptable in automobiles. Second, typical steam engines require a large-volume boiler for storing the steam as it is generated, prior to supplying the steam to the engine. This large storage area takes up a considerable amount of space in a vehicle that would desirably be available for cargo or passengers. Some improvements were made by the use of faster-heating "flash" boilers, which did not store a large volume of steam, for example as shown in Doble U.S. Pat. No. 1,675,600, but there remain delays and complexities of control that would be unacceptable to today's drivers, who expect to get in the vehicle and drive off without having to consider the operation of the vehicle power plant.

BRIEF SUMMARY OF THE INVENTION

The present invention is directed to a method and system for an external combustion engine operable using at least two different working fluids to do work. The engine is started by providing a first compressed gaseous working fluid (typically compressed air) at a sufficient pressure to move internal components of the engine that in turn rotate a shaft to generate power. At the same time the first compressed working fluid is provided to the engine, a second working fluid that is liquid at ambient temperature (typically water) is provided to a heater to be heated. The second working fluid is heated to its boiling point and converted to gas form. Additional heat is provided to increase the pressure of this second gaseous working fluid. Once the pressure is increased to a sufficient level, the second working fluid is provided to the engine to generate power, in combination with or in lieu of the first working fluid. The working fluids are exhausted from the engine after expansion, and may be separated into two separate fluids. If so, the gaseous first working fluid is recompressed for later use, and the second working fluid is condensed for reheating.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIG. 11 is a view, partially in cross-section and partially in elevation, of a steam trap useful in each of the embodiments of the invention, and also showing one embodiment of a normally-closed valve also useful in each of the embodiments of the invention.

DETAILED DESCRIPTION OF THE INVENTION

Figure 1:
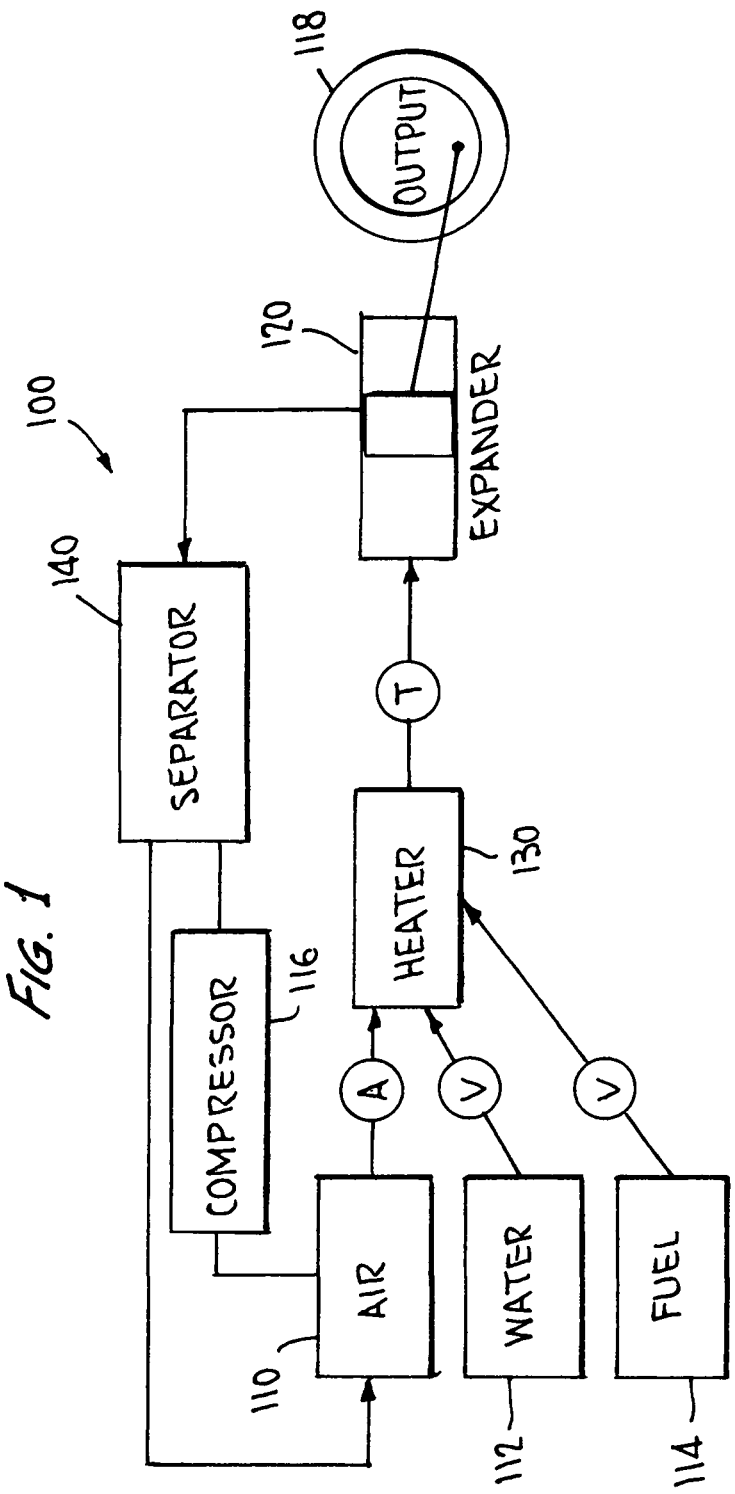
FIG. 1 is a simplified block diagram illustrating various components of a power generation system according to one embodiment of the invention.

FIG. 1 is a simplified block diagram of a power generation system 100 according to one embodiment of the present invention. In this embodiment of the invention, power generation system 100 is employed to power a vehicle, such as an automobile; however, other usages are envisioned, and are discussed below. Power generation unit 100 is powered by a combination of at least two working fluids. The first working fluid is a substance that is gaseous at ambient temperatures; air is referred to in the embodiment disclosed in detail herein, but it is to be understood that other substances, such as nitrogen, or combinations of substances could be used. An example of a system for combined heat and power generation, useful in a dwelling, using nitrogen as the first working fluid, is discussed in detail below in connection with FIG. 6. It is also within the scope of the invention to employ a gaseous fuel as the first working fluid, and also as fuel to be combusted to heat the second working fluid. The second working fluid is a substance that is liquid at ambient temperature, and is heated to form a pressurized gas. Water, which is heated to form steam, is referred to as the second working fluid in the embodiment disclosed in detail herein, but again it is to be understood that other substances or combinations of substances could be used.

Power generation unit 100 includes a first storage vessel 110 for storing compressed air, a second storage vessel 112 for storing water, a tank 114 for supply of liquid fuel (or other means for supply of heat), an expander 120 for conversion of heat energy into work, which may comprise a reciprocating-piston engine, turbine or other device, and which is coupled to an output device, such as the road wheels 118 of a vehicle, a heater 130 for heating the first and second working fluids to a desired working temperature and pressure, (optionally) a separator 140 for separating the first and second working fluids for reuse, and a compressor for recompressing the air. Also provided, but not shown in FIG. 1, is a control system comprising a suitably-programmed microprocessor, which is responsive to control inputs from the operator, and controls flow of the air and water, regulates operation of the heater, and so forth, as needed to effectuate the operation of the system, as discussed in further detail below.

In the preferred embodiment, power generation unit 100 is a closed system, meaning that the air and steam that are used to produce the power are not intentionally vented to the outside environment, but are collected after exhaust from the expander, (optionally) separated, and reused. However, those skilled in the art will recognize that the closed nature of system 100 does not mean that there is no leakage.

Broadly describing the operation of this system, when the operator desires to employ the system, e.g. in the vehicle case by turning an ignition switch and depressing an accelerator pedal, the system initially responds by supply of compressed air from tank 110 to expander 120, so that power is produced immediately by the expansion of compressed air. Thus there is no delay in getting underway. Simultaneously, fuel and water are supplied to heater 130, so that steam is produced. The compressed air may also be heated in heater 130, to further increase its energy content. Preferably, heater 130 is essentially a "flash" boiler, meaning the steam is produced as needed and is not stored, so that steam is produced quickly (as compared to a boiler in which steam is stored) and so that heat is not lost due to radiation from a steam-storing boiler. As detailed further below, it is energy-efficient to employ steam as the source of motive power as compared to compressed air, because storage of energy in the form of compressed air is not particularly efficient. Accordingly, as soon as steam is available it is employed to provide the bulk of the power required.

As indicated above, the expander can be any device capable of accepting pressurized gas, in the preferred embodiment air, steam, and mixtures thereof, and turning its energy into useful work. For example, the expander can be a piston engine or turbine.

It will be appreciated that the advantage realized by provision of a supply of compressed air mentioned above, that is, elimination of the start-up delay inherent in steam engine operation, could likewise be realized in other ways. For example, an electric motor and battery could be used to provide instantaneous power at start-up. However, provision of the compressed air supply has other advantages. For one, a single expander can serve to accept both air and steam, avoiding the complication of a separate electric motor. Further, the availability of a supply of compressed air means that at the end of a run, the air can be used to purge the expander of condensed steam, so that the cylinders (of a piston engine) will be empty. This in turn avoids problems with "hydraulic lock", which can occur in conventional steam engines unless the cylinders are drained before start-up. That is, if steam or compressed air is supplied to the cylinders of a piston engine that has not been thus drained of condensate, the presence of incompressible water in the cylinders may cause damage. The common prior practice was to provide cylinder drain cocks that were opened to drain condensate. This manual step would be a major inconvenience to today's motorist. As set forth more fully below, in the present invention, where a reciprocating-piston engine is used, solenoid-operated valves controlled by the microprocessor will be employed to control the amount of steam and air admitted to the expander. Likewise, solenoid-operated drain cocks could be provided and operated automatically.

As noted above, the expander 120 can be any of a variety of types of device for turning energy in a pressurized working fluid into mechanical work. The fact that in the preferred embodiment a supply of compressed air is available means that instantaneous "throttle response" can be provided by supply of compressed air to the expander, so that steam need not be provided immediately in order that the operator's demand for power can be satisfied. More specifically, in order that any personal vehicle can be acceptable in today's market, it will be required to respond substantially immediately to the operator's demand for more power; a time lag between the operator's depressing the accelerator pedal and the system's supplying additional power would simply be unacceptable. As even a relatively fast-boiling flash boiler will take some seconds to produce a significant increase in steam, a steam-only vehicle would be unacceptably unresponsive. By comparison, provision of a supply of compressed air according to the invention means that air can be supplied to the expander immediately in response to an operator's request, providing satisfactory responsiveness.

Figure 2:
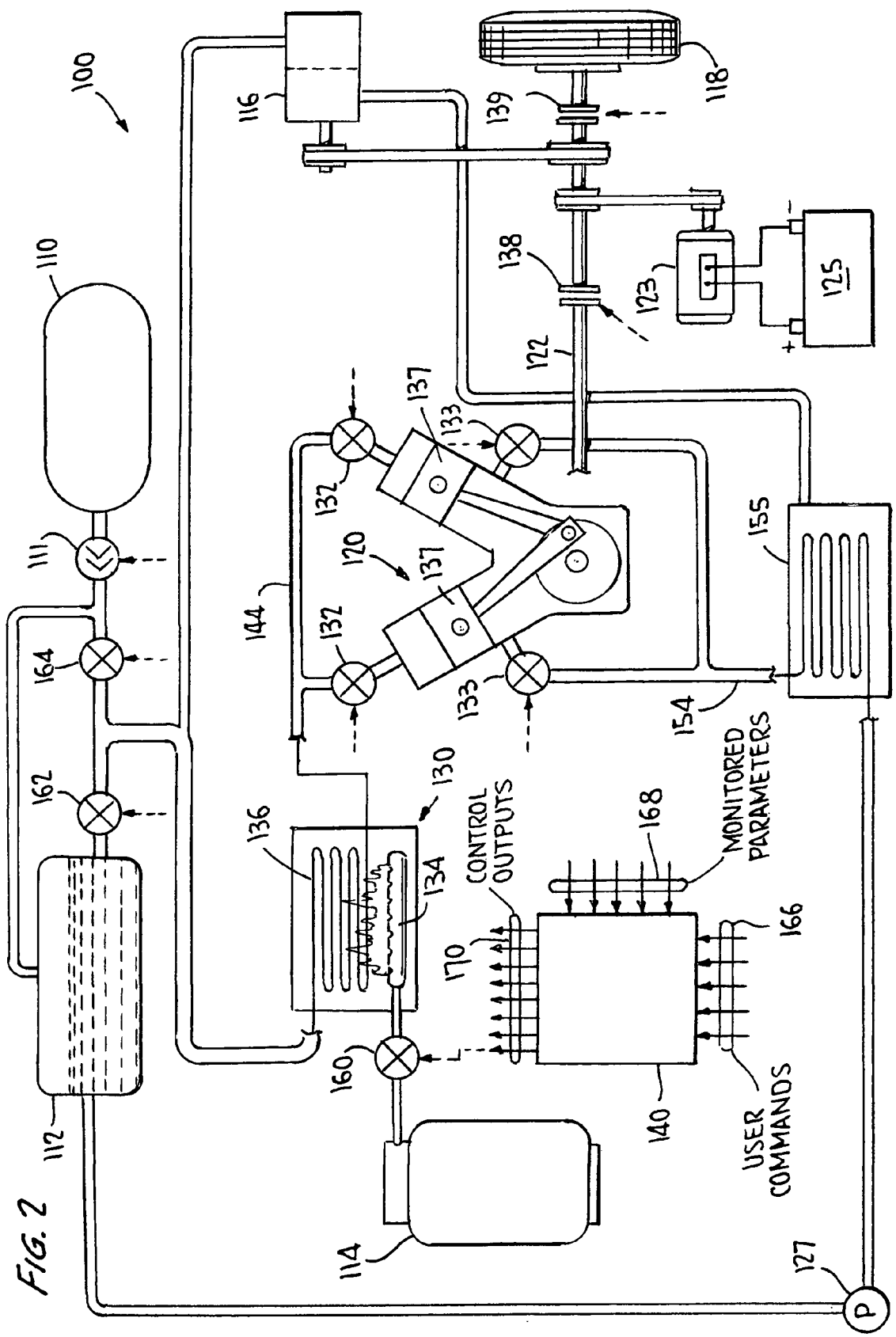
FIG. 2 is a more detailed block diagram illustrating the major system components of the system of the invention in an embodiment designed for powering a vehicle.

FIG. 2 shows a more detailed schematic diagram of a preferred embodiment of the invention, with many components in common with the simplified diagram of FIG. 1. Thus, FIG. 2 again shows a first storage vessel 110 for storing a gaseous first working fluid. The first working fluid is a material that is in a gaseous state at ambient temperatures, for example, methane, natural gas, nitrogen, or atmospheric air. Where convenient, air is referred to as the first working fluid in this disclosure, for simplicity, but the invention is not to be limited thereto. Vessel 110 stores air at pressures that greatly exceed the ambient atmospheric pressure, for example, at a pressure of 300 bar (4500 psi, or $3 \times 10^7$ Pa). This tank pressure is reduced by a regulator 111 to a suitable working pressure. Regulator 111 may be adjustable responsive to a control signal from control circuitry 140 (discussed below) to control the working pressure.

Second working fluid storage vessel 112 stores the second working fluid. The second working fluid is a material that is in a generally liquid state at ambient temperatures, for example, ammonia or water. Where convenient, water is referred to as the second working fluid in this disclosure, for simplicity, but the invention is not to be limited thereto. Vessel 112 may be insulated and/or heated to prevent the water from freezing at ambient temperatures that are below the freezing point of water; by comparison, addition of so-called antifreeze compositions is undesirable as they interfere with the efficient formation of steam. As illustrated, compressed air from tank 110, reduced to an appropriate pressure, can be provided to pressurize vessel 112, to propel the water throughout the system.

Engine 120 is an external combustion engine whereby the pressurized working fluids are provided to the engine to be expanded and thus do mechanical work. Engine 120 is illustrated as a two-cylinder, reciprocating piston-engine, but a turbine or other type may be employed. Specific embodiments employing a turbine in lieu of a reciprocating-piston engine are discussed in connection with FIGS. 9 and 10 below. In the FIG. 2 embodiment, the inlet valves 132 that are operated to control inlet of the working fluids to the engine 120 and thus regulate its power output are preferably solenoid valves controlled by control circuitry 140, comprising a microprocessor and associated equipment well-known to those of skill in the art. Such solenoid valves are far simpler than the mechanical valve arrangements common in earlier steam engines.

It will be appreciated that these solenoid valves 132 can be of the proportional variety, wherein the valve is opened to a degree corresponding to the amount of flow to be provided, or can be simpler open-or-closed valves, operated on a duty cycle corresponding to the amount of flow desired. It will also be appreciated that (if a reciprocating piston engine is used) reversing of the vehicle can be accomplished simply by control of the phase according to which the valves are opened, so that the engine rotates in the reverse direction. This avoids the necessity of a reversing-gear arrangement, as needed with internal combustion engines, which will ordinarily only operate in one direction.

Exhaust valves 133 may also be used to control the exhaust of the working fluids after expansion, or valveless ports may be provided in the lower portion of the cylinders, so as to be opened when the pistons 137 reach the lower portion of their stroke. Exhaust valves 133 may also, and may preferably, be provided at the upper ends of the cylinders, so as to avoid the loss of power that would occur due to compression of the working fluid remaining in the cylinders after expansion.

As illustrated, engine 120 receives a supply of either or both working fluids, having been heated in heater 130. As illustrated, heater 130 may comprise a burner 134 receiving fuel from tank 114, and a boiler 136, receiving the working fluids from tanks 110 and 112. Control circuitry 140 controls the amount of the first and second working fluids that is supplied to boiler 136 responsive to the load (that is, the amount of power required) in a manner detailed below, and controls ignition of and supply of fuel to burner 134 as well. It is to be noted that the fuel combusted can be solid, e.g., coal, wood, or biomass, liquid, such as diesel fuel, gasoline, or kerosene, or gaseous, such compressed natural gas.

In the embodiment illustrated, engine 120 provides mechanical power to vehicle wheels 118 via shaft 122 (the mechanical connection between engine and shaft not being illustrated, but within the skill of the art). Shaft 122 can also provide power to additional devices, such as an alternator 123 providing electrical power to charge a battery 125, and to a compressor 116, for recompressing the first working fluid after exhaust from the engine.

The compressor 116 is not intended to recompress the first working fluid to the pressure in which it is stored in tank 110, but merely to compress it to the point that it can be effectively supplied to engine 120; working pressures of on the order of 100 psi are envisioned. As will be further explained below, the compressor 116 can also be operated in a "regenerative" mode, wherein when the total load on the vehicle is negative, as during descents and braking, the compressor 116 can be used to recover the kinetic energy of the vehicle by using it to compress air. A further vessel may be needed to capture this compressed air, as it will not be compressed nearly to the degree of the air in vessel 110, and a valve-controlled ambient-air intake may also be needed, as it would be undesirable for the compressor 116 to draw air through the engine under these circumstances.

Clutches 138 and 139, also controlled by the control circuitry, may be provided to effectively disconnect the engine 120 from the wheels 118 and the wheels from the entire power plant, so that the engine 120 can be used to charge the battery 125 without driving the wheels, and so that the compressor 116 can be used to regenerate the kinetic energy of the vehicle by compressing air without having to rotate the engine, respectively. Mechanical brakes would also be provided, for redundancy and to provide braking power in excess of the compressor's ability to absorb kinetic energy. Clutches 138 and 139 can be conventional clutches, or may be other devices effectively connecting and disconnecting the portions of shaft 122. For example, clutches 138 and 139 can be implemented using planetary gear arrangements.

The two cylinders of the engine 120 receive the first and second working fluids from boiler 134 through line 144, under control of valves 132, as discussed above. Engine 120 exhausts the working fluids after expansion through line 154. The exhausted working fluids may be supplied to optional condensor/separator 155, in which the second working fluid is condensed back to liquid form and is separated from the first working fluid. The condensor can be any device that allows the exhausted second working fluid to give up sufficient heat to be condensed; for example, it may comprise a conventional heat exchanger for giving heat off to the ambient atmosphere. As the working fluids cool, the second working fluid will return to the liquid state, while the first working fluid remains in the gaseous state. This simplifies their separation, as the liquid can simply be drained off and returned to vessel 112 by a pump 127 and the gas drawn off by compressor 116. Alternatively, the temperature of the working fluids can be controlled to remain above the boiling point of the second working fluid, so that it remains gaseous and is not separated from the first working fluid.

Heater 130 is designed to efficiently heat the working fluids so as to pressurize them for supply to the engine 120 to cause it do work. Preferably heater 130 is a flash heater capable of rapidly heating the working fluids to, for example, 900° K and 100 psi. Heater 130 is divided into two sections, a burner 134 and a boiler 136. Burner 134 generates heat in any desired manner, in the embodiment shown by burning a liquid or gaseous fuel stored in tank 114. Boiler 136 may comprise a spiral of tubing receiving the first and second working fluids, as shown. Note that boiler 136 does not comprise a large reservoir for storing water, and does not store a large volume of steam, both in order that the boiler can respond quickly to changes in the amount of pressurized working fluid required at any given time. The amount of fuel provided to the heater 130 and thus the amount of heating that takes place is controlled by control circuitry 140 through flow control valve 160.

In the embodiment shown in FIG. 2, boiler 136 receives the first and second working fluids and heats both, to increase the pressure of the first working fluid and to vaporize and pressurize the second working fluid. The flow of the working fluids is controlled by control circuitry 140 responsive to the load on the engine, and in response to measurement of their temperature and pressure. As will appear in detail below, the first and second working fluids are supplied in varying degrees responsive to the load and the temperature of the boiler. The amount of each supplied at any given time is controlled by control circuitry by way of valves 162, 164. They may be mixed external to the boiler, as shown, or within the boiler. It is also within the invention to supply the first working fluid directly to engine 120, bypassing boiler 130. This alternative is discussed below in connection with FIGS. 9-11. It may also be advantageous to mix the gaseous first working fluid with the liquid second working fluid in a venturi, wherein the second working fluid is entrained in a flow of the first. See FIG. 8, discussed below.

Control circuitry 140 is provided to regulate the operation of system 100. Control circuitry 140 may comprise any known type of controller or control circuitry, and will typically be an appropriately-programmed microprocessor. In the vehicle embodiment shown, the operator indicates the amount of power required using conventional accelerator and brake pedals (not shown); these and other control inputs (e.g., cruise control) are provided to the control circuitry as indicated at 166. Control circuitry 140 is also provided with signals indicative of various parameters sensed throughout the system by sensors (not shown), such as the temperature and pressure of the working fluids, as indicated at 168. Control circuitry 140 then regulates the temperature, pressure, and flow rate of the working fluids and the supply of fuel responsive to power demand by providing control signal outputs as indicated at 170. Note that the control signal and parameter sensor connections have been largely omitted from FIG. 2 to avoid complicating the drawing unduly; implementing these items is within the skill of the art. The arrowheads with dashed lines directed to the valves, regulator, and clutches shown indicate that these are controlled by the control circuitry 140. It will also be appreciated by those of skill in the art that the control circuitry can be provided with other inputs and used to control other functions not specifically discussed. For example, a thermostatic sensor may be provided for additional control, e,g., to shut the burner off if it overheats.

It is also within the scope of the invention to provide means for preheating the engine prior to use, and for keeping it relatively warm when not in use. For example, the engine can be provided with a battery-powered electrical heater to warm its components prior to use, and it can be provided with water jacketing connected to an insulated reservoir, so as to retain warmth when shut off. Both are useful in reducing problems known to exist in connection with starting steam engines from cold. These can include the presence of condensate, which can cause hydraulic lock, as above. A warm engine also exhibits less friction and better piston sealing.

Figure 3:
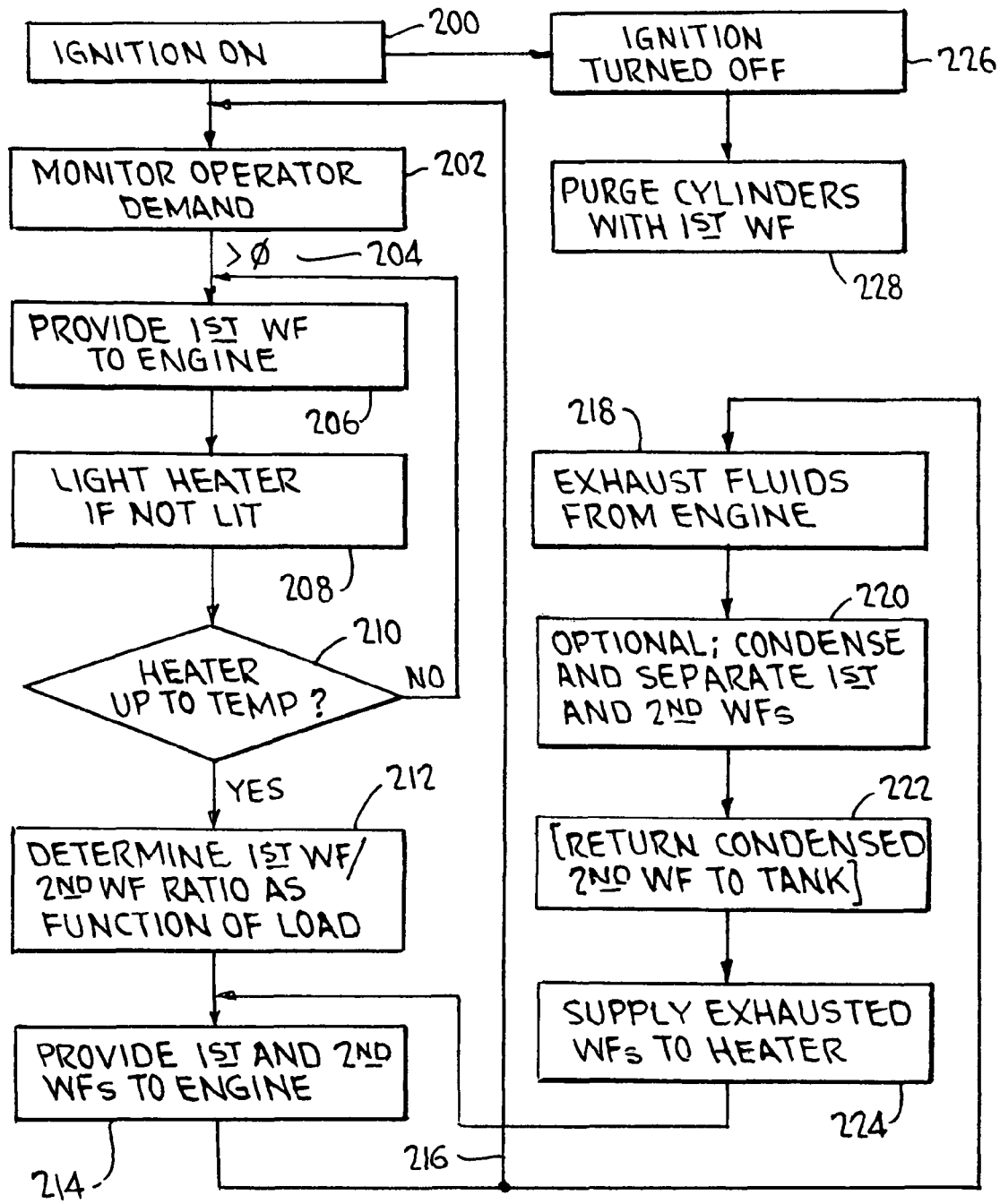
FIG. 3 is a flow diagram illustrating a process for operating the power generation system according to one embodiment of the invention.

FIG. 3 is a flow diagram exemplifying the primary steps in a process for using the power generation system of the engine. For purposes of this discussion, it is presumed that the power generation system is a piston engine disposed within an automobile, as in the case of FIG. 2. However, it should be understood that the present invention is not limited thereto. Further, it is to be noted that FIG. 3 is not a flowchart of computational operations per se but rather depicts the more important steps in the overall process.

Initially, a user of the automobile needs to "start" the vehicle by placing the vehicle in an operating mode whereby the external combustion engine can be used. This is done in step 200 by the operator's turning a conventional ignition key, or the equivalent, signaling to the control circuitry that the vehicle is to be driven. If the engine is fitted with a heater to prewarm it, the heater may be activated at this time.

At step 202, the operator demand for power is monitored; this step is repeated at short intervals (e.g. every 100 milliseconds) throughout the operation of the vehicle, so as to ensure suitably responsive behavior. The operator demand may be positive, indicating a desire for more power, e.g, for acceleration, may be steady, indicating that the current power output is appropriate, or may be negative, as during descents or braking. If the operator demand is positive, as indicated at 204, the control circuitry provides the first working fluid (abbreviated "1$^{st}$ WF" in FIG. 3) to the engine, at 206. If the heater is not lit, it is lit at 208.

At step 210, the temperature of the heater is measured. If it is up to its preferred working temperature, the process goes to step 212, where the control circuitry determines the proper ratio and amount of the first and second working fluids (the latter being abbreviated "2nd WF" in FIG. 3) to be supplied responsive to the load, and then accordingly controls their supply to the engine, at 214.

As indicated by line 216, a control loop is established, which, after the heater is up to temperature, consists of steps 202, 212, and 214; that is, the operator demand is monitored repeatedly, and the control circuitry likewise repeatedly determines the correct ratio and amount of the first and second working fluids to be supplied to the engine and controls their supply accordingly.

The steps on the right side of FIG. 3 illustrate what is done with the working fluids after exhaust from the engine, at 218. At 220 there is illustrated the optional step of condensing the second working fluid and separating it from the first. If this is done, the second working fluid is returned to vessel 112, at 222; if not, the exhausted working fluids are returned at 224 to the boiler for reuse.

Finally, at shutdown, when the ignition is turned off at 226, compressed air may be provided to the cylinders of the engine for a short period while the exhaust valves are open, to purge any remaining steam and avoid problems of hydraulic lock caused by condensed steam, at 228.

The present invention provides significant advantages over prior art external combustion engines. Specifically, through the use of the compressed first working fluid to initially power the engine during start-up, the user is able to extract some, not necessarily full, power from the engine. This allows the immediate response from the system that users desire, for example causing a vehicle to move, without having to wait for the boiler to heat up to the point of being capable of producing significant quantities of steam at suitable pressure. Once the system is up to temperature, full power is available using either the second fluid or a combination of the first and second fluids.

More specifically, it is a general objective of the invention to employ fuel to make steam whenever possible, as opposed to employing the compressed air. This is because compression of air is generally not a particularly efficient use of energy. Nonetheless, the fact that compressed air is always available provides the system with a substantial advantage in addition to allowing the vehicle to be driven substantially immediately, namely that the proportion of air to steam can be adjusted at any time to provide responsiveness to the operator's requirements for power. That is, even though a flash boiler is to be used, so that steam can be produced very rapidly, there will still be a delay of several seconds after a large increase in power is demanded before the boiler can respond. That gap in power availability, which otherwise would render the vehicle sluggish and unresponsive, can be filled by supply of compressed air. This and several additional aspects of the invention can be better understood by reference to FIG. 4.

Figure 4:
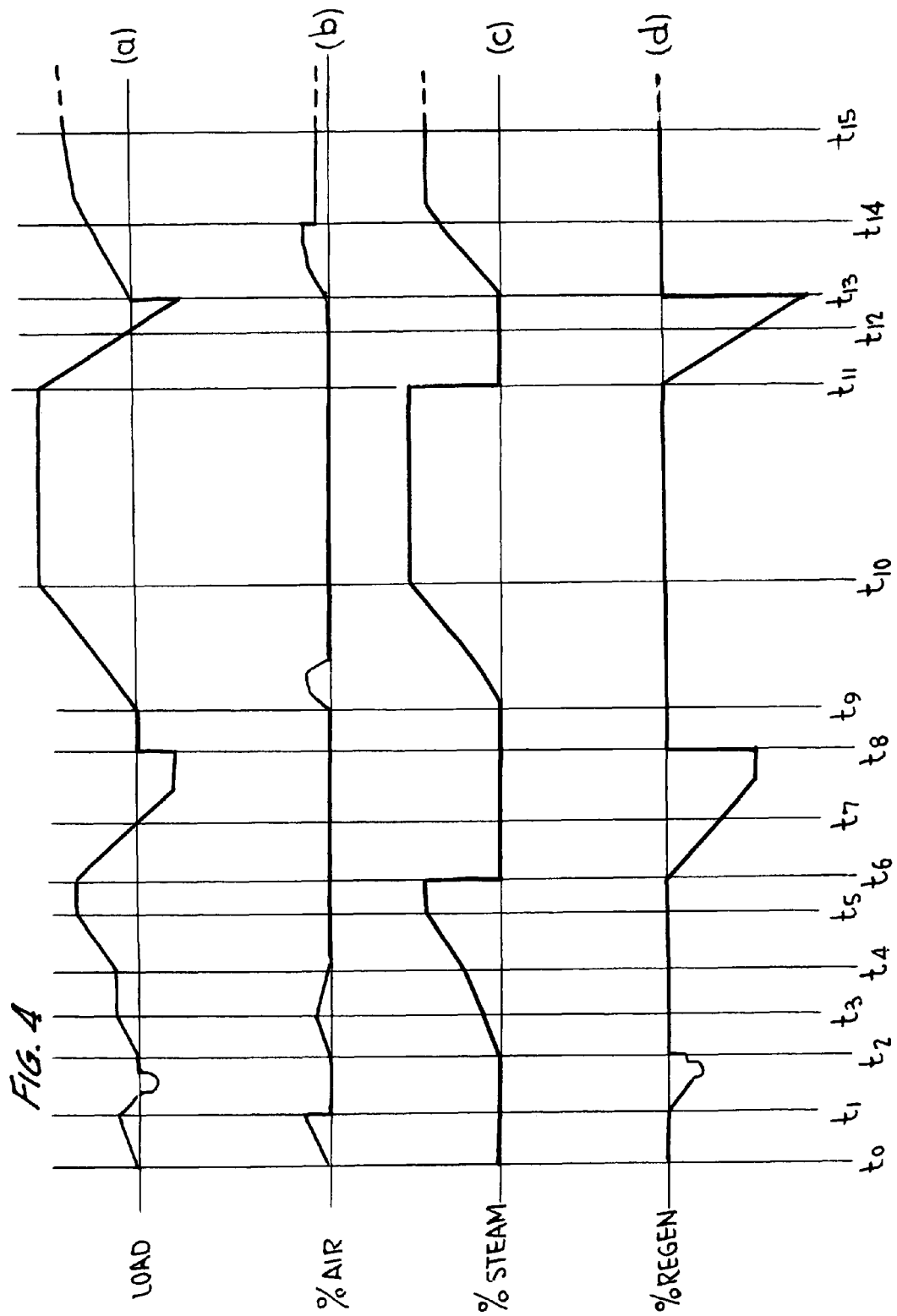
FIG. 4 is a diagram showing operation of the system according to the invention as employed in a vehicle operated over a typical journey.

FIG. 4 shows in FIG. 4(a) the vehicle's demand for propulsive power over a trip of some minutes' duration, in FIG. 4(b) the percentage of that power which is supplied by supply of compressed air to the engine, in FIG. 4(c) the percentage of that power which is supplied by supply of steam to the engine, and in FIG. 4(d) the use of the kinetic energy of the vehicle to drive the compressor 116 and thereby recover or regenerate some of the energy used in propelling the vehicle. Thus, the sum of the power levels shown in FIGS. 4 (b)-(d) is equal to that of FIG. 4(a).

Thus, at time $t_0$ the vehicle is initially energized by the operator's turning the key as above, and stepping on the accelerator pedal, so that the load increases as shown by FIG. 4(a) from $t_0$ to $t_1$. (Note that if fitted with a piston engine the vehicle could be operated in the reverse direction and the load would still be positive, as shown; the load is only negative when descending or braking.) At this point the engine is cold, so the load is satisfied by supply of air alone, as indicated by FIG. 4(b). The burner would be lit at this point, as indicated by FIG. 3. At $t_1$ the load goes negative, as the operator, for example, presses the brake pedal and stops the vehicle at $t_2$; accordingly, the compressor is used to recover the kinetic energy as shown by FIG. 4(d). In this circumstance, clutch 138 is disengaged so that the compressor can be driven by the wheels, recovering the kinetic energy of the vehicle's motion, without having to rotate the engine, which would be wasteful due to friction.

At $t_2$ the operator again initiates acceleration, as shown by FIG. 4(a). By now the boiler is at least partially up to temperature, so both air and steam are used to provide power, as shown by FIGS. 4(b) and (c) respectively. Soon thereafter there is sufficient steam pressure available to provide the power required, so the fraction provided by air goes to zero at $t_4$. The load is steady from $t_5$ to $t_6$, so that the power provided by steam is likewise steady, as shown by FIG. 4(c). At $t_6$ the load again goes negative, so that the power provided by steam goes to zero, and regeneration is provided, as shown by FIGS. 4 (c) and (d) respectively.

The vehicle is at a stop from $t_8$ to $t_9$, so no power is provided by either air or steam. This illustrates a key advantage of the invention, in that no fuel is consumed by the engine when at a stop, as is consumed by an internal combustion engine at idle. However, it will be appreciated that certain "parasitic" loads do not cease when the vehicle stops, most notably air conditioning, lights, and radio, and therefore an electric motor and battery or the like will be needed to power such accessories when the vehicle is stopped. In the event battery 125 becomes discharged in these circumstances, clutch 139 can be opened, so that the engine can be run at low power to power the alternator 123 and recharge the battery. This illustrates another important advantage of the invention, namely, that the external combustion engine can be operated at low power with no loss of efficiency. By comparison, internal combustion engines can only be operated efficiently at relatively high power levels. See, e.g., Severinsky U.S. Pat. No. 6,209,672.

At $t_9$, the operator again initiates acceleration, and again the initial power is supplied by air, as indicated by FIG. 4(b). In this case, the steam is available relatively quickly, as the boiler is now fully up to temperature, and so the fraction of power contributed by air drops quickly to zero, as shown by FIGS. 4 (c) and (b) respectively. Another sequence of steady power demand followed by deceleration is illustrated by the sequence $t_{10}$-$t_{11}$-$t_{13}$. Acceleration begins again at $t_{13}$, with air again supplying the initial energy, and with the steam taking over shortly thereafter, as previously. However, this sequence illustrates one possible variation, in that the air fraction does not go to zero at $t_{14}$, but continues to supply some of the power required. This may prove useful in "real-world" driving, where the loading varies constantly under some circumstances; it might be disabled, for example, in the event the operator activates a "cruise control" function, indicating that a steady speed is to be maintained. In that case the control circuitry will monitor the vehicle speed and add power or initiate regeneration as required; given that the loading will ordinarily not vary much with the cruise control set, operation in steam-only mode may be preferable for reasons of ultimate efficiency.

It is also within the scope of the invention to operate the vehicle in air-only mode in low-load situations, e.g., in city traffic. In these circumstances it may be energy-efficient to use the compressed air as the only source of propulsive power.

The system of the invention and its operation having thus been described, certain of its advantages and features can now be discussed briefly.

As noted above, use of a reciprocating-piston external-combustion engine has several advantages with respect to a conventional internal-combustion power plant, particularly as applied to road vehicles. As above, a steam engine can be operated at high efficiency at low loads, while an internal-combustion engine must be run at relatively high loads to be efficient. Conventional automobiles are provided with powerful engines for good acceleration which are very much under-loaded in the bulk of ordinary driving, and are inefficient as a result.

Further, as noted above, a reciprocating-piston external-combustion engine can be operated in either direction of rotation simply by control of the phase of the intake and exhaust valves. Given that according to the invention the valves are solenoid valves controlled by the control circuitry, control of their phase is trivial to accomplish. In this way the cost and complexity of a reversing-gear arrangement as needed with an internal-combustion engine are eliminated.

Another advantage provided by the invention is due to the fact that a reciprocating-piston external-combustion engine is self-starting; that is, steam simply needs to be admitted to the cylinders and the engine will start to rotate. By comparison, an internal combustion engine requires an external starter, to drive it to some minimum RPM so that the fuel can be compressed for ignition. Thus, the cost and complexity of a starter motor are eliminated according to the invention.

For the same reason, the reciprocating-piston external-combustion engine can simply be shut off when the vehicle is stopped, whereas the vast majority of internal combustion engines in vehicles idle when stopped, wasting fuel. There are now some "stop-start" vehicles becoming available, wherein the internal combustion engine is shut off when the vehicle is stopped, but these are difficult to implement, as doing so places great demands on the starter and battery, and further provides an inherent delay when the operator desires to proceed, as the engine must then be restarted.

Additional advantages of the specific constructional features of the invention as disclosed herein include the following. As noted, preferably the flow of the first and second working fluids in to the cylinders is controlled by solenoid valves controlled by the control circuitry. This gives an effectively unlimited control over the timing of admission of the working fluids into the cylinder, which can accordingly be tailored to optimize their supply over a wide range of operating conditions of the vehicle. This is very useful in achieving high efficiency.

For example, it will be apparent that a vehicle cruising at 60 mph on a flat road needs much less power than one climbing a steep grade at the same speed. In prior steam engines, e.g. in locomotives, which had mechanical valves operated by valve gear to admit and exhaust steam from the cylinders, a great deal of attention was given to making the valve gear adjustable so that the amount of steam provided was just what was required and no more. Many different types of complicated mechanical valve gear arrangements were developed directed to this end, and the engineer was required to carefully adjust the valve gear as the load varied.

By comparison, according to the present invention, the control circuitry can simply control the length of time the valves are open responsive to the load, which need not be directly measured; the appropriate amount of power to be produced can be effectively determined by monitoring the pressure exerted by the operator on the accelerator pedal.

Another advantage provided by the invention is due to the fact that a reciprocating-piston external-combustion engine provides maximum torque at zero RPM; that is, it is capable of moving a vehicle from rest without the interposition of a slipping clutch, as in a conventional manual-transmission vehicle, or a fluid clutch or other mechanism of some kind as in a conventional automatic-transmission vehicle. By comparison, an internal-combustion engine develops no torque at zero RPM, and develops its maximum torque at elevated RPM, which requires a clutch so that the engine can be operated at relatively high RPM when moving the vehicle from rest, and also requires a multi-speed transmission so that the engine's RPM can be more or less accurately matched to the vehicle's ground speed and load. A transmission is not needed in the present invention, and although clutches are shown for providing certain desirable operating modes discussed above, they need not be slipping clutches but can be simple locking devices. Both are substantial advantages in terms of cost and complexity. Of course, reduction gearing may still be needed to match the engine's optimal operating RPM to the wheels.

In the foregoing, and in the grandparent application Ser. No. 12/801,841, the system of the invention was described in an embodiment using air as the first working fluid and steam as the second working fluid, but it was made explicit that other substances could be used for either working fluid. Similarly, although the invention was described in connection with use in a vehicle, it was made explicit that it could be used in other applications. Further, mention was made above that it might be advantageous to introduce the first and second working fluids to the burner via their admixture in a venturi nozzle. These and other further aspects of the invention will now be addressed in detail.

Figure 5:
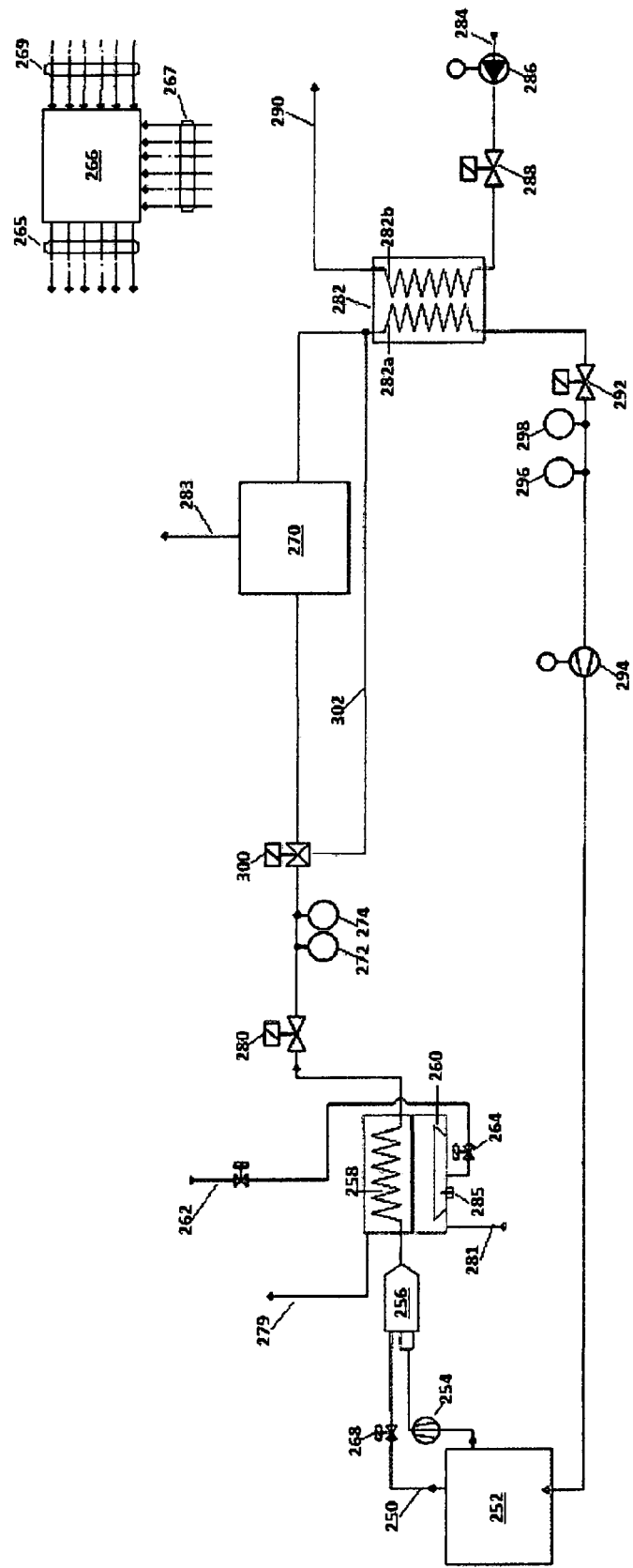
FIG. 5 is a schematic diagram of a first embodiment of a stationary combined heat and power plant (CHP), employing the principles of the invention summarized above.

Thus, FIG. 5 is a schematic diagram of a combined heat and power system (CHP) employing the principles of the invention, that is, to employ two working fluids to power a device for generating mechanical power and also to provide heat. Such a system might be useful for household use, e.g., to provide electrical power and domestic hot water. In this embodiment air is used as the first working fluid, to drive an expander until steam can be produced in a boiler. In other embodiments, nitrogen can be employed as the first working fluid (see FIG. 6), or a compressed fuel gas, such as compressed natural gas (CNG) can be used both as the first working fluid, to drive the expander, and subsequently as fuel for the heater (see FIG. 7).

Thus, in FIG. 5, water and air are supplied from a water reservoir 252 to a boiler 258 via a nozzle 256, and thence to an expander 270. The reservoir is pressurized by a vacuum pump 294, which pumps the condensed water and air exhausted from expander 270 back to the reservoir 252. In this way the system is completely closed, and the vacuum pump 294 is employed in two modes, to transport exhausted water and air back to the water reservoir, and to act as an air compressor. The water reservoir 252 acts as a water trap, in that the water drops to the bottom and the compressed air (or other gaseous first working fluid) stays at the top flowing to the nozzle 256. This is an easy and effective way of separating the air and water before they are mixed at the nozzle. Water from reservoir 252 is pumped by a pump 254 to nozzle 256, to which air is also admitted. Thus, pump 254 sets the pressure at which the water is injected onto the boiler, which may be in excess of the pressure provided by vacuum pump 294. Nozzle 256 is detailed in FIG. 8, discussed below, and is constructed in such a way that the compressed air atomizes the water, so that it is efficiently heated in boiler 258. More specifically, the stream of compressed air and/or water is admitted to boiler 258, which comprises a coil of tubing disposed above a burner 260. Burner 260 is supplied with combustible fuel, natural gas in the embodiment shown, from a supply 262, via a regulator 264. Ambient air is admitted to the burner 260 at 281, and combustion products are exhausted to the atmosphere at 279.

The stream of air and/or steam is then directed to expander 270 for producing power and doing mechanical work as indicated at 283. For example, expander 270 can be implemented as a turbine for generating electrical power responsive to supply of a pressurized working fluid, or a compressor for compressing a refrigerant for later expansion in order to provide chilled air for air conditioning purposes.

Generally as discussed above, fuel pressure regulator 264 and other controls are controlled by a microprocessor 266. As previously, the control connections from the microprocessor 266 to the various components controlled thereby, as indicated at 265, as well as inputs to the microprocessor from various sensors monitoring process parameters throughout the system, indicated at 267, and control inputs to the microprocessor, as indicated at 269, are not shown, to simplify the drawing. Implementation of these connections, and of the control of the various valves and the like comprised by the system by the microprocessor responsive to control inputs are within the skill of the art.

In accordance with the objects of the invention, flow of the first working fluid, air in this embodiment, and of the second working fluid, steam in this embodiment, are controlled by the microprocessor 266 via air control valve 268 and pump 254, respectively. Thus, for example, when power is needed responsive to user command, compressed air may be first admitted to the expander 270, while the burner 260 is lit by an igniter 285 controlled by the microprocessor 266 and steam is produced; when the steam is up to working temperature and pressure, as measured by temperature and pressure gauges 272, 274, it is supplied to the turbine in addition to or in lieu of the compressed air. A cutoff valve 280 is provided as a safety precaution in case a complete shut off of steam is required, e.g., due to a failure at the heat exchanger or further downstream.

The expander 270 can be any device for converting the energy from the compressed air/steam stream to useful work; for example, the Green Turbine discussed in detail below in connection with FIG. 6, below, or a refrigeration or air conditioning compressor. The exhausted stream may be supplied to a heat exchanger 282. Water from an inlet 284 is pumped by pump 286 through heat exchanger 282, comprising a hot-side coil 282*a* and a cold-side coil 282*b*, to recover waste heat in the expander exhaust stream, and supplied at 290 for any desired use. A shut-off valve 288 is provided to control flow of water through heat exchanger 282. The cooled exhaust stream is returned to water reservoir 252 via a shut-off valve 292 and vacuum pump 294 (provided to ensure water is not left in the expander 270 upon system shutdown, and to pressurize the water reservoir 252, as above); the temperature and pressure of the returned stream may be monitored by sensors 296 and 298, respectively. When it is only desired to use the burner 260 and boiler 258 to provide heat for hot water, the expander 270 can be bypassed by 3-way valve 300 and bypass line 302.

Thus, the system of FIG. 5 employs first and second working fluids to operate an expander for doing useful work, while also providing recovery of heat energy in the exhausted stream. It should also be understood that the system of FIG. 5 could be provided as an add-on to an existing home hot water system, essentially by adding the hot-side coil 282*a* into an existing hot-water heater. In this way the system of the invention could provide mechanical work from expander 270 as desired, possibly by configuring this as a turbine providing electrical power, and employing the waste heat in the expander exhaust stream as part of the domestic hot water system.

Figure 6:
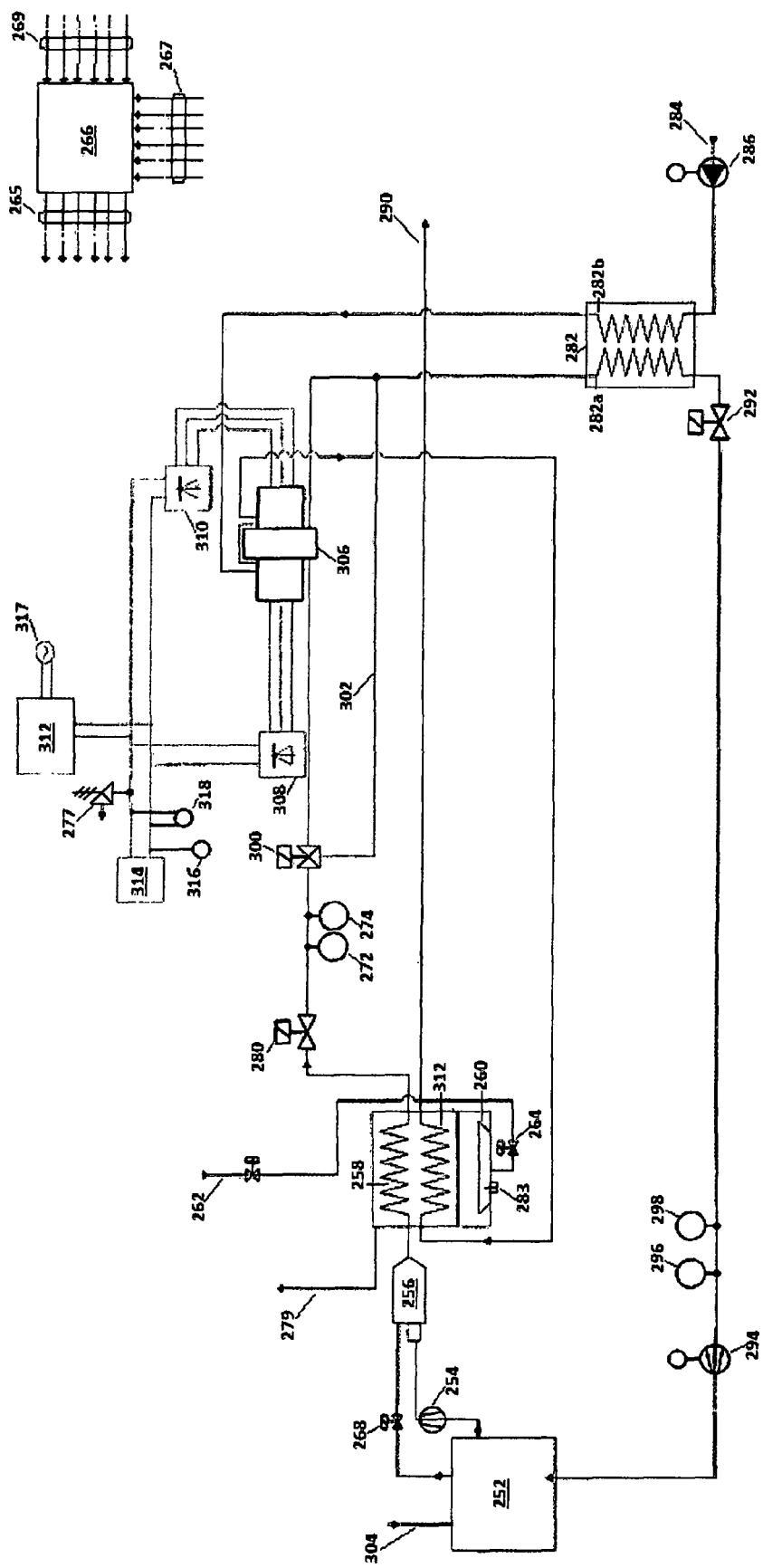
FIG. 6 is a schematic diagram of a second embodiment of a stationary combined heat and power plant (CHP), employing the principles of the invention summarized above.

FIG. 6 shows a further embodiment of the system of FIG. 5, wherein nitrogen is used as the first working fluid. Use of nitrogen as the first working fluid provides two benefits. First, nitrogen will prevent oxidation in the lines as might occur if air were used. Second, being an inert gas, nitrogen provides a nonflammable working fluid that increases safety in case of a system failure. Further, nitrogen can be used to purge the entire system, either before the unit is shipped at the manufacturer or during commissioning of the system. Where not specified, the components of the FIG. 6 system are the same as described above in connection with FIG. 5, and have the same reference numbers and functions. Similarly, features shown in FIG. 6 but not FIG. 5 can be employed in the FIG. 5 embodiment. In this embodiment the expander is a turbine 306 for generating electrical power responsive to supply of a pressurized working fluid. In a successfully-tested prototype, the turbine 306 was implemented using a so-called Green Turbine, available from Green Turbine, Inc. of Toronto, Canada. This unit produces, for example, 1.2 KW of electrical power from dry superheated steam at 180-200° C. at a pressure of 5.2 bar.

Thus, in the system of FIG. 6, nitrogen from a source indicated at 304 is introduced into the water reservoir 252 and a nitrogen/water mix is introduced into the boiler 258 via nozzle 256. The nitrogen/steam stream is supplied to the turbine 306, which generates electrical power. The Green Turbine has two working turbine wheels, connected to two independent shafts. Each shaft has its own alternator, providing two sources of power. Accordingly, two three-phase rectifiers 308, 310 rectify the 1000 Hz AC produced by the Green Turbine to DC, which is supplied to a load 314, and can be inverted by inverter 312 to produce 60 Hz AC, if desired, at an terminal 317. The DC current and voltage are monitored by sensors 316 and 318. A tachometer 277 can be provided to ensure the turbine does not spin beyond its rated speed.

The FIG. 6 embodiment shows a further refinement, whereby a second coil 312 can be provided over the burner 260, to heat water for domestic use. More specifically, water from a cold water inlet 284 will flow through three elements, absorbing heat from each. In a first step, water will pass through heat exchanger 282 where the water will absorb the latent heat of the turbine exhaust stream, condensing the exhaust steam back into its original liquid phase, as discussed above. Next the water will pass through a second element, a water jacket provided as part of the turbine 306. The water cools the alternators inside the turbine housing, adding to the efficiency of the system of the invention. That is, in this way the heat otherwise radiated from the turbine to the outside environment is captured, while preventing the turbine 306 from overheating and causing damage to the alternators. The water then passes through a third element 312, a coil directly exposed to the burner 260 to increase the water temperature up to adequate temperature for domestic heating and hot water. Hot water is thus provided at 290 for domestic usage.

Figure 7:
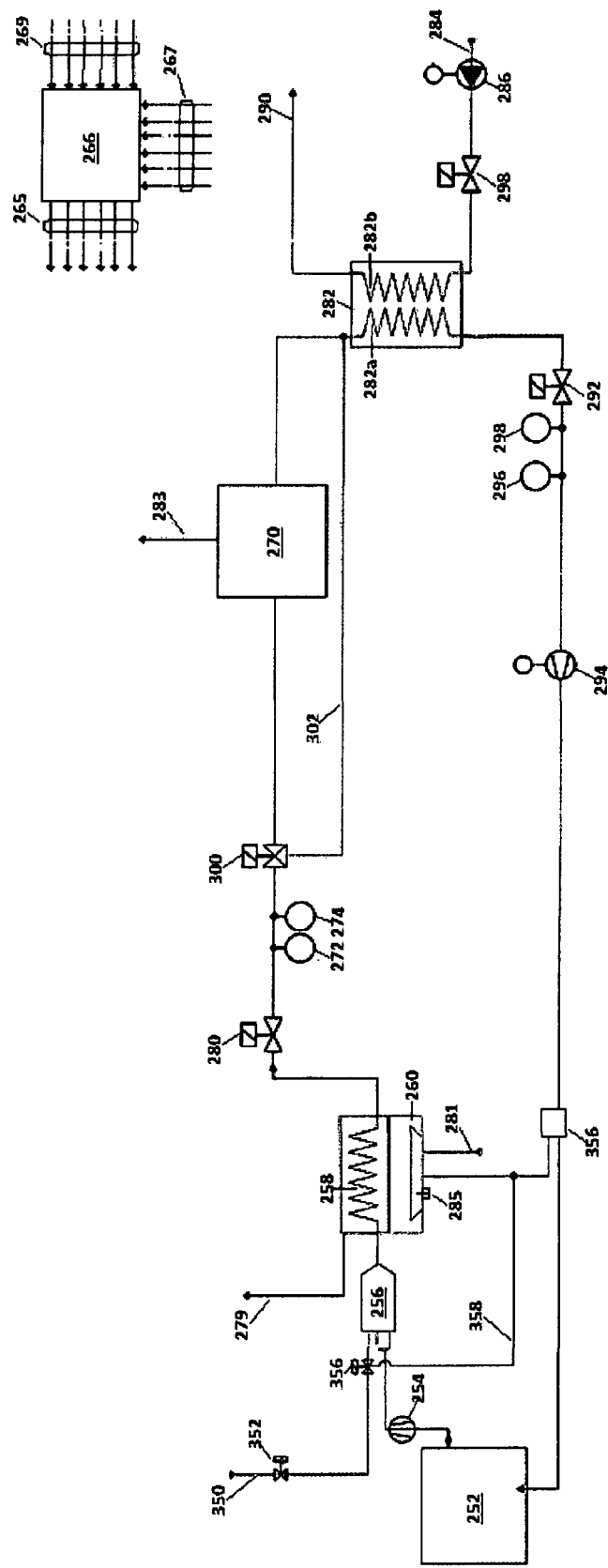
FIG. 7 is a schematic diagram of a third embodiment of a stationary combined heat and power plant (CHP), employing the principles of the invention summarized above.

FIG. 7 shows a further embodiment of the system of the invention, in which, as mentioned above, a compressed fuel gas such as compressed natural gas (CNG) is used both as the first working fluid, to operate the expander before the second working fluid is up to temperature so as to be vaporized, and as fuel for the burner. The FIG. 7 system includes numerous components in common with the FIGS. 5 and 6 embodiments; common components are commonly numbered and have the same functions as discussed above.

Thus, in FIG. 7, CNG from a supply 350 is admitted to the nozzle 256, where it is injected into a stream of the second working fluid in liquid form (again, water in the example shown) from a reservoir 252. The gas stream can be shut off by valve 352 and its pressure regulated by regulator 354, both under the control of microprocessor 266, as previously. As above, the connections of the microprocessor 266 to the various controlled components and parameter sensors are not shown, for simplicity, and their implementation is within the skill of the art.

The stream of CNG and/or water is passed from the nozzle 256 to the boiler 258, where it is heated by the burner 260, and thence to the expander 270. Waste heat in the expander exhaust is captured by heat exchanger 282, as above. The exhaust stream is then passed to gas separator 356, where the CNG is separated from the condensed water. The CNG is then supplied to burner 260, and the water to the reservoir 256. In order to provide a direct path for the CNG from the supply 350 to the burner 260, a three-way valve 356 in the CNG supply line is provided, together with a direct connection to the burner supply.

The advantage of this embodiment, that is, using CNG as the first working fluid, is simply that of simplicity; by using the compressed fuel as both the first working fluid, that is, as propellant to drive the expander when steam is not yet available, and as fuel for the burner, separate supplies of propellant and fuel need not be provided.

As indicated above, various combination of first and second working fluids are suitable for use in the system of the invention, in each of the embodiments discussed in detail and others within the scope of the invention. In addition to air, nitrogen, and CNG as the first working fluid, refrigerants such as Freon 488 or Honeywell R245fa may be desirable, especially where the first working fluid is desired to have a low boiling point, as where the expander is a refrigeration or air conditioning unit. Likewise, in addition to water as the second working fluid, ammonia may be desirable. Selection of these fluids and optimization of the pressures, temperatures, flow rates and like parameters relevant to most efficient operation of the system of the invention are matters of engineering choice, within the skill of the art.

Figure 8:
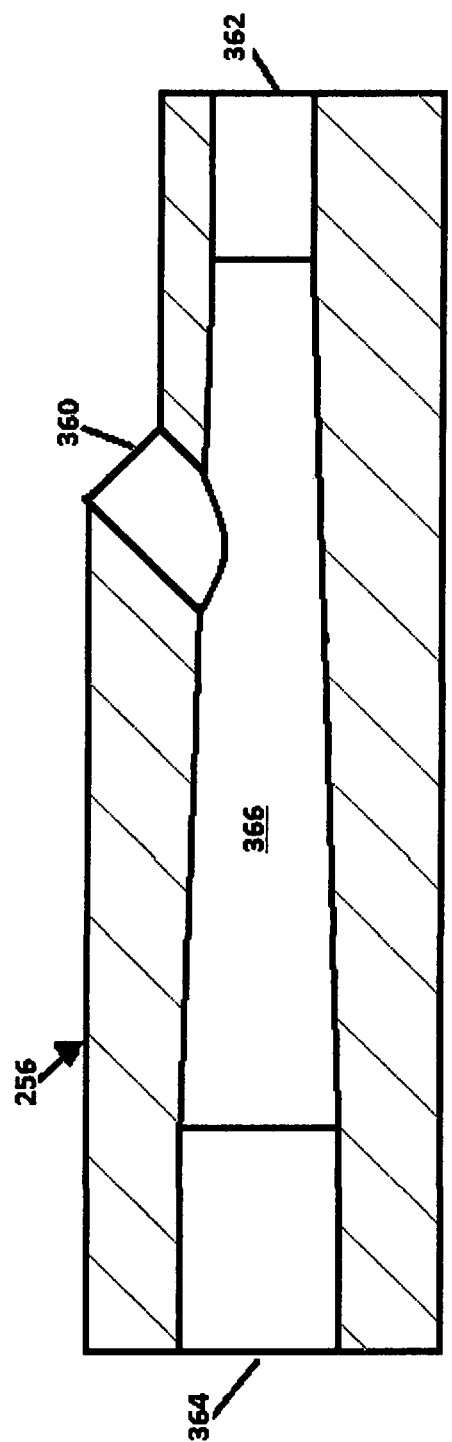
FIG. 8 is a cross-sectional view of a venturi nozzle used to mix the first and second working fluids prior to supply to the boiler.

FIG. 8 is a cross-sectional view of venturi nozzle 256, employed in the embodiments of the combined heat and power (CHP) system of FIGS. 5-7, and also applicable to the vehicle propulsion embodiment of the invention discussed in FIGS. 1 and 2. As illustrated, nozzle 256 may be fabricated as a unitary solid member, having inlets 360 for the first working fluid and 362 for the second working fluid, and an exit 364 for the mixture thereof. An internal passageway 366 extends in a straight line from inlet 362 to exit 364, while inlet 360 communicates with passageway 366 at an angle, typically 45°. In use, when the first working fluid (again, a pressurized gas) is admitted at inlet 360 and the second working fluid (a liquid at this point) is admitted at inlet 362, the first working fluid tends to atomize the second, so that when the combined stream is admitted to boiler 258, the second working fluid is efficiently heated. As illustrate, the passageway 366 of nozzle 256 may diverge from inlet 362 to exit 364, depressurizing the stream and further atomizing the liquid second working fluid.

Further Improvements Provided by the Present Application

The present continuation-in-part application is directed to further improvements in the use of the invention in connection with vehicle propulsion, specifically in the use of a steam turbine in lieu of a reciprocating-piston engine as the expander converting energy of steam into mechanical work, and to elimination of solenoid control valves at certain points in favor of more reliable mechanical valves.

Figure 9:
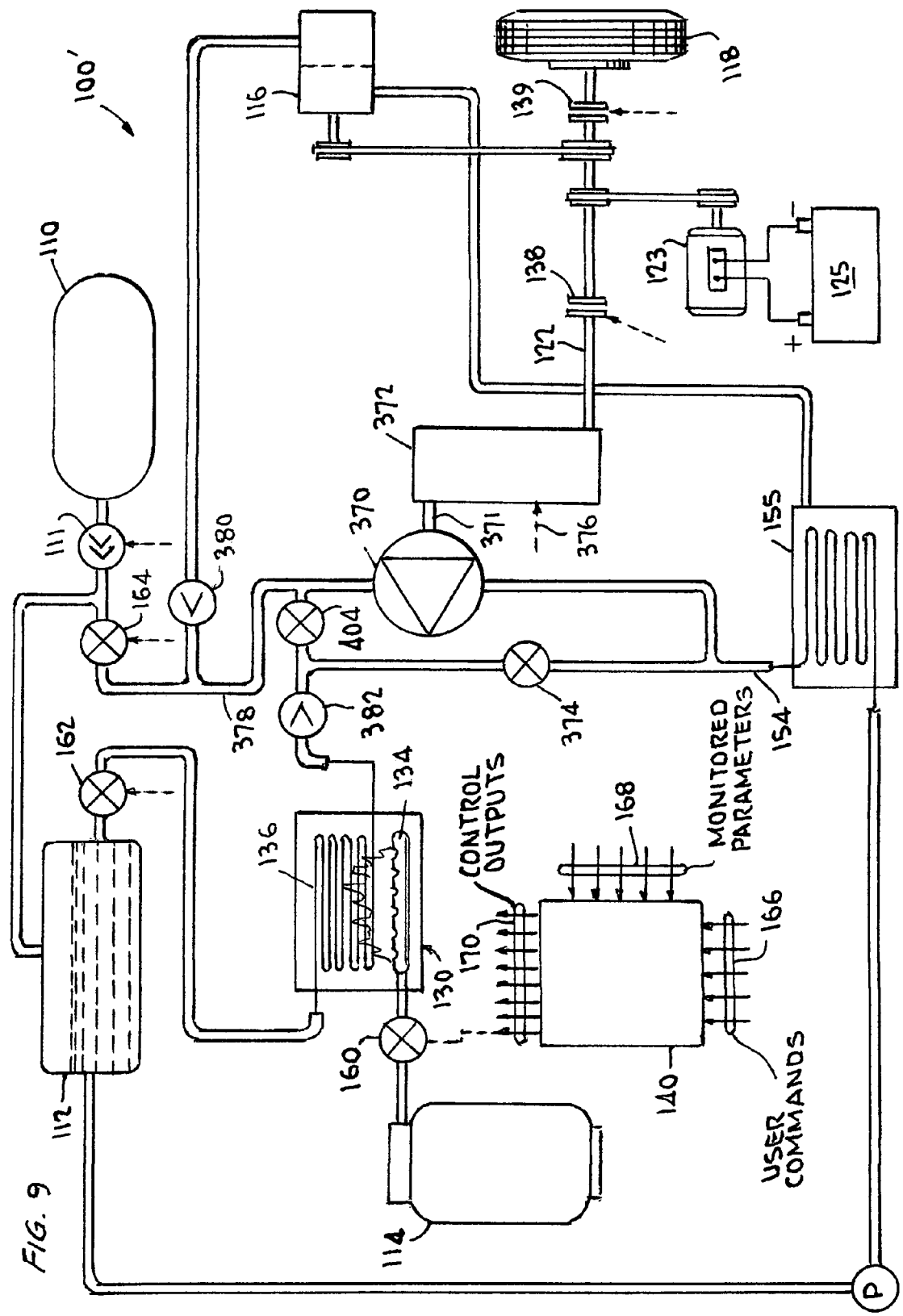
FIG. 9 is a schematic diagram of a further embodiment of a vehicle propulsion system employing the principles of the invention.

Thus, FIG. 9 shows a modification of the vehicle propulsion embodiment 100' of the invention, wherein a turbine 370 replaces reciprocating piston engine 120 of FIG. 2 as the prime mover of the vehicle. Turbine 370 may be the Green Turbine discussed above, or may be one of a number of steam turbines produced by Skinner Power Systems, LLC of Erie, Pa. Turbine 370 is connected to road wheels 118 via a variable-speed gearbox 372, in turn controlled by microprocessor 140, as indicated by arrow 376. Gearbox 372 will typically comprise a clutch, torque converter, or similar device permitting decoupling of the turbine 370 from the gearbox 372.

Thus, in use, steam from boiler 136 is supplied to turbine 370, which converts the energy of the steam into mechanical energy, in turn transmitted to road wheels 118 by way of variable-speed gearbox 372.

As is well known, steam turbines demand "dry" steam, that is, without liquid moisture present; "wet" steam, with moisture present, tends to erode the turbine blades. By comparison, reciprocating-piston steam engines as in FIG. 2 are more tolerant of wet steam, due to their much lower speeds, e,g., several thousand RPM versus 20,000 RPM or more for turbines. Therefore, until the steam is heated to a high enough temperature, e.g. 350° F., the steam exiting boiler 136 is diverted to condenser 155 by a valve 374. The equivalent valve 300 shown in FIGS. 5-7 was described above as a solenoid-operated valve controlled by microprocessor 140. For reasons of improved reliability it is desired to implement this bypass valve 374 as a mechanical valve operated automatically when the steam reaches a suitable temperature. Such valves are known in the industry as "steam traps" and are available in several designs. A suitable valve is described in connection with FIG. 11, below. The solenoid-operated bypass valves 300 shown in FIGS. 5-7 can likewise be advantageously replaced with steam traps. In order to ensure that no wet steam reaches the turbine upon start-up, a mechanically-operated, normally-closed valve 404, also discussed in connection with FIG. 11, can be interposed in the steam supply line, as shown. Similarly, other solenoid valves exposed to steam, such as cutoff valves 280 of FIGS. 5-7, can be replaced with mechanically-operated valves for improved reliability.

Other aspects of the drive system of FIG. 9 are as discussed above in connection with FIG. 2, such as the use of compressed air to operate the turbine upon start-up, before steam is being effectively produced. However, if the compressed air is fed to the boiler as in FIG. 2, it will be diverted by the steam trap bypass valve 374. Accordingly, compressed air can be fed directly to the turbine by a line 378 controlled by valve 164, opened upon start-up and closed when the steam has reached a suitable temperature and pressure to operate the turbine 370. A check valve 380, with flow being permitted only in the direction of the arrow shown, is provided to prevent back-flow of this compressed air to compressor 116. Normally-closed valve 404 will prevent this compressed air from interfering with flow of water from tank 112 to boiler 130, respectively.

Where the torque produced by turbine 370, as multiplied by gearbox 372, is in excess of that required to propel the vehicle, the excess may be used to drive alternator 123 to charge battery 125, via a suitable inverter/charger (not shown); if the vehicle's torque demand is in excess of that available at any given instant from the turbine, the alternator can be operated as a motor to supply the additional torque needed. Again, see Severinsky U.S. Pat. No. 6,209,672.

Figure 10:
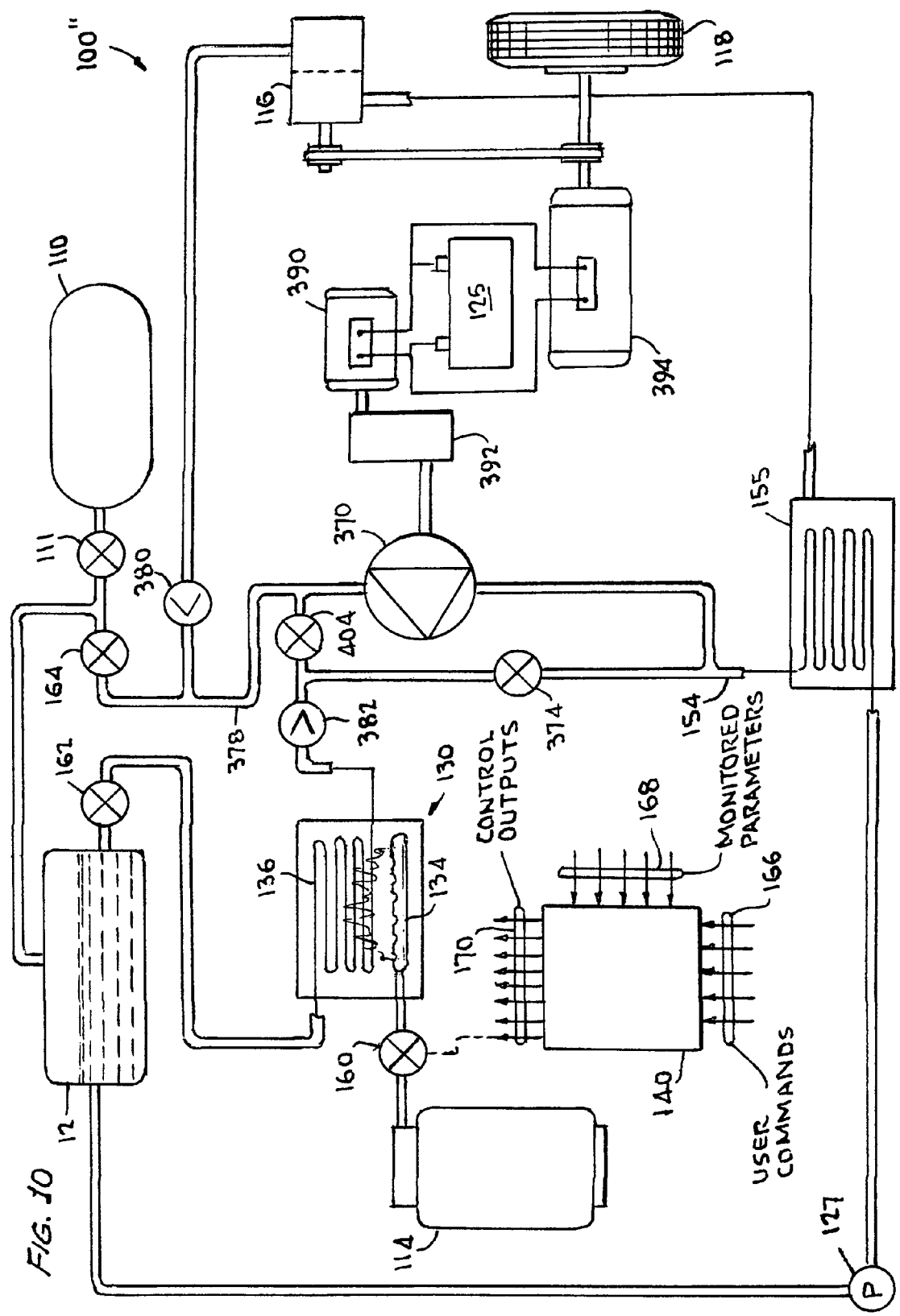
FIG. 10 is a schematic diagram of an additional embodiment of a vehicle propulsion system employing the principles of the invention.

FIG. 10 shows a further embodiment 100" of the vehicle-propulsion embodiment of the invention. In this embodiment, the turbine 370 drives a generator 390 through a fixed-ratio gearbox 392, so as to reduce the rotational speed of the turbine 370 to an appropriate speed for the generator 390. Generator 390 is connected to battery 125 as indicated. Battery 125 is also connected to a motor/generator 394, which can be operated as a motor to drive road wheels 118, and as a generator recovering the vehicle's kinetic energy and charging battery 125 when appropriate, e.g., when the vehicle is decelerating. Accordingly, when turbine 370 is driven by supply of steam, motor-generator 390 provides power directly to motor/generator 394; any excess power is employed to charge battery 125.

It will be appreciated by those of skill in the art that it will likely be preferred to employ AC induction devices as generator 390 and motor/generator 394, while battery 125 is capable of storing only DC. Accordingly, inverter/rectifiers will be required to be interposed between generator 390 and motor/generator 394 and battery 125; these are not shown, but are well-understood in the art. Again, see Severinsky U.S. Pat. No. 6,209,672.

Accordingly, the embodiment of FIG. 10 amounts to a series hybrid vehicle, where the torque employed to drive the wheels 118 is derived entirely from motor-generator 394, employing power generated by generator 390, in turn driven by turbine 370. Battery 125 serves as a load-leveling device, in that electrical energy not needed for propulsion can be stored in battery 125, while electrical power required in excess of that being produced by generator 390 can be provided by battery 125. As power is always available from battery 125, acceleration of the vehicle from rest does not require that the turbine be started initially by supply of air, that is, before steam is being effectively produced. However, this is nonetheless a possibly desired feature of the invention, and can be implemented as discussed above in connection with FIG. 9.

As mentioned above, FIG. 11 shows one possible implementation of a steam trap 374, used to prevent wet steam from reaching the turbine. Various types of steam traps are well-known in the art. In the embodiment shown, steam trap 374 comprises a thermostatically-actuated valve that connects the coil 136 of boiler 130 to condenser 155 until the temperature of the steam produced is sufficiently high, typically 350° F., that the steam is dry and suitable for powering turbine 370.

Steam trap 374 in the embodiment shown comprises a bellows 396 inside a housing 398 having an inlet 398*a* connected to coil 136 and an outlet 398*b* connected to condenser 155. Bellows 396 is sealed, and contains a quantity of a liquid—typically water, or a mix of water with alcohol or other high-boiling point material so as to define the boiling temperature of the liquid—that changes state, forming a vapor and expanding substantially with increase in temperature. Bellows 396 is formed to define a number of circumferential ribs, so that the bellows expands axially when the liquid within boils. A semi-spherical valve 400 is mounted on bellows 396, opposite a valve seat 402, such that as bellows 396 expands with increase in steam temperature, valve 400 is engaged with valve seat 402, closing the passage to condenser 155.

In order to ensure that the wet steam emitted from boiler 130 upon start-up does not tend to reach turbine 370, a normally closed valve 404 is provided as shown. In the embodiment illustrated, this valve 404 is held normally closed by a spring 406, urging a seal member 408 against a seat 410. After stream trap 374 has been closed by increase in the temperature of the steam, steam pressure will start to build. When the pressure of the steam from boiler is sufficiently high, valve 404 will open against the bias of spring 406, allowing steam to pass through passages 412 drilled through a spring-retaining member 414 and thence to turbine 370. Member 414 is threaded to the body of valve 404, allowing adjustment of the preload of spring 406 and hence of the steam pressure at which valve 404 opens. Valve 404 could also be made to operate thermostatically, e.g., using a bellows as in steam trap 374 to open the valve.

In essence, accordingly, valve 404 prevents wet steam from reaching turbine 370 prior to the steam reaching an appropriate temperature and pressure, while steam trap 374 vents the wet steam to the condenser during start-up.

As discussed above, a thermostatically-operated steam trap as shown in FIG. 11 can be employed in the vehicle-propulsion embodiments of the invention shown in FIGS. 9 and 10, and also a replacement for the solenoid-operated bypass valves 300 of the combined heat and power systems of FIGS. 5-7. Such a steam trap would also be useful in the schematic system of FIG. 1. Normally-closed valve 404 would also be useful as a replacement for the cutoff valves 280 of FIGS. 5-7.

Although the present invention and its advantages have been described in detail, it should be understood that various changes, substitutions and alterations can be made herein without departing from the spirit and scope of the invention as defined by the appended claims.

What is claimed is:
1. A power generation unit comprising:
   a first vessel holding a quantity of a first pressurized gaseous working fluid that is gaseous at ambient temperature, being pressurized to a pressure substantially greater than ambient pressure;
   a second vessel holding a quantity of a second working fluid that is in a liquid state at ambient temperature;
   a controllable heater in controllable communication with at least said second vessel for heating at least said second working fluid;
   an expander in controllable communication with said heater and said first vessel, such that said expander can receive said first pressurized gaseous working fluid and/or receive said second working fluid, having been heated by said heater to be vaporized and form a second pressurized gaseous working fluid, said first and/or second pressurized gaseous working fluids being supplied to at least one chamber in said expander where said pressurized gaseous working fluids can expand, causing said expander to produce power;
   a controller responsive to a control input to determine the power required to be provided by said expander, and for controlling heating of said at least second working fluid in said heater, and flow of said first and second working fluids from the respective vessels to the heater and to said at least one chamber of the expander responsive to the amount of power required; and
   a mechanically-operated valve for preventing said second working fluid from reaching said expander prior to said second working fluid reaching a predetermined minimum temperature.

2. The power generation unit of claim 1, further comprising a heat exchanger for heating water by recovery of waste heat from an exhaust of the expander.

3. The power generation unit of claim 2, wherein water heated in said heat exchanger is further employed to cool the expander.

4. The power generation unit of claim 2, wherein water heated in said heat exchanger is further heated in said controllable heater.

5. The power generation unit of claim 1, wherein said first working fluid is selected from the group consisting of air, nitrogen, compressed fuel gas, and refrigerants.

6. The power generation unit of claim 5, wherein said first working fluid is compressed fuel gas, and wherein said compressed fuel gas is further employed as fuel for said heater.

7. The power generation unit of claim 1, wherein said expander is a turbine coupled to a generator for producing electrical power.

8. The power generation unit of claim 1, wherein when a control input to the controller requires that said expander produce power at a time when said second working fluid is not heated sufficiently to form a second pressurized gaseous working fluid capable of being expanded in said at least one chamber of said expander to produce the amount of power required, said controller controls flow of said first pressurized working fluid from said first vessel to said at least one chamber of said expander, causing said expander to produce power, and also causes said heater to heat said second working fluid to be vaporized to form a second pressurized gaseous working fluid, and after said second pressurized gaseous working fluid has been formed by vaporizing said second working fluid, controls supply of said second pressurized gaseous working fluid to said at least one chamber of said expander, partially or wholly in lieu of the first pressurized gaseous working fluid, to cause said expander to produce power in response to the control input.

9. The power generation unit of claim 1, further comprising a liquid recovery device for condensing said second pressurized gaseous working fluid following expansion in and exhaust from said expander, and separating said first and second working fluids and supplying at least said second working fluid back to said second vessel.

10. The power generation unit of claim 1 wherein said heater comprises a heating element and a boiler element.

11. The power generation unit of claim 10 wherein the boiler element is a flash boiler.

12. The power generation unit of claim 1, further comprising a nozzle in which streams of the pressurized first working fluid and the second working fluid while in liquid form are combined, such that the second working fluid while in liquid form is effectively atomized prior to supply to said heater.

13. The power generation unit of claim 12, wherein said nozzle comprises a first entry for said stream of said second working fluid that is in a liquid state at ambient temperature, a second entry for said stream of said first working fluid, an exit for the streams after combination, and an internal passageway that extends along a straight line from said first entry to said exit, and wherein said second entry communicates with said internal passageway at an angle to said straight line, whereby said stream of said pressurized first working fluid atomizes said stream of said of said second working fluid.

14. The power generation unit of claim 13, wherein said internal passageway diverges from said first entry to said exit.

15. The power generation unit of claim 1, wherein said power generation unit is configured to propel a vehicle, said expander is a turbine capable of being driven by said working fluids to produce mechanical power, and wherein an output shaft of said turbine is connected to wheels of said vehicle for transmission of power to said wheels.

16. The power generation unit of claim 1, wherein said power generation unit is configured to propel a vehicle, said expander is a turbine capable of being driven by said working fluids to produce mechanical power, wherein an output shaft of said turbine is connected to a generator to produce electrical power, wherein a motor/generator is connected to wheels of said vehicle for transmission of mechanical power to said wheels, and wherein a battery is connected between said generator and said motor/generator to store electrical power provided by said generator and to supply electrical power to said motor/generator.

17. A method for operating an expander responsive to selective supply of two different pressurized gaseous working fluids to at least one chamber of said expander wherein the pressurized gaseous working fluids can expand, causing said expander to produce power, comprising the steps of:
providing a supply of a first pressurized working fluid which is gaseous at ambient temperature;
providing a supply of a second working fluid that is liquid at ambient temperature, and which can be heated to form a supply of a second pressurized gaseous working fluid;
providing a controller which monitors the amount of power that is to be produced by the expander, and performs the following steps in response to a requirement that the expander produce power:
if said expander has not been started, starting said expander by supplying said first pressurized gaseous working fluid to said at least one chamber of said expander, causing said expander to produce power;
supplying said second working fluid to a boiler in liquid form;
applying heat to said boiler to convert said liquid second working fluid to a second pressurized gaseous working fluid; and
when said second pressurized gaseous working fluid is available, providing said second pressurized gaseous working fluid from said boiler to said at least one chamber of said expander wholly or partially in lieu of said first pressurized gaseous working fluid, causing said expander to produce power, employing a mechanically-operated valve for preventing said second working fluid from reaching said expander prior to said second working fluid reaching a predetermined minimum temperature; and
during operation of the expander, monitoring the requirement for power to be produced by said expander and determining the appropriate amounts of the first and second working fluids to be supplied to said expander.

18. The method of claim 17, wherein said step of providing said first pressurized gaseous working fluid to said expander further comprises the steps of:
providing said first pressurized gaseous working fluid to said boiler, further pressurizing said first gaseous working fluid, and
providing said further pressurized first gaseous working fluid to said expander from said boiler.

19. The method of claim 17, wherein a stream of said first and second pressurized gaseous working fluids is exhausted from said expander at a pressure and temperature lower than the pressure and temperature at which they are admitted to the expander, and comprising the further step of:

recovering heat from the exhausted stream by admitting the exhausted stream to a heat exchanger, wherein a stream of water is disposed in heat-exchange relationship with the exhausted stream, and thereby heating the stream of water and condensing said second pressurized gaseous working fluid such that it is returned to the liquid state.

20. The method of claim 19, further comprising the steps of separation of said first and second working fluids from the exhausted stream after condensation of the second working fluid, and returning the second working fluid to the supply thereof.

21. The method of claim 19, wherein said stream of water is supplied to the expander after having been heated in said heat exchanger, to further heat the stream of water and to cool the expander.

22. The method of claim 19, wherein said stream of water is supplied to the boiler after having been heated in said heat exchanger, to further heat the stream of water.

23. The method of claim 17, wherein said first working fluid is selected from the group consisting of air, nitrogen, compressed fuel gas, and refrigerants.

24. The method of claim 17, wherein said first working fluid is compressed fuel gas, and wherein said compressed fuel gas is further employed as fuel for said heater.

25. The method of claim 17, wherein said expander is a turbine coupled to a generator for producing electrical power.

26. The method of claim 17, comprising the further step of mixing streams of the first and second working fluids prior to admission of the second working fluid to the boiler, such that the first working fluid atomizes the second working fluid while in liquid form.

27. The method of claim 26, wherein said streams of the pressurized first working fluid and the second working fluid while in liquid form are combined in a nozzle, such that the liquid second working fluid is effectively atomized prior to supply to said heater.

28. The method of claim 27, wherein said nozzle comprises a first entry for said stream of said second working fluid while in liquid form, a second entry for said stream of said pressurized first working fluid, an exit for the streams after combination, and an internal passageway that extends along a straight line from said first entry to said exit, and wherein said second entry communicates with said internal passageway at an angle to said straight line, whereby said stream of said pressurized first working fluid atomizes said stream of said of said second working fluid.

29. The method of claim 28, wherein said internal passageway diverges from said first entry to said exit.

* * * * *